Patented Apr. 6, 1943

2,315,495

UNITED STATES PATENT OFFICE 2,315,495

PROCESS OF PURIFYING PHOSPHORIC ACID ESTERS

Hermann Beeg, Magdeburg, and Kurt Weichert, Leuna, Germany; vested in the Alien Property Custodian No Drawing. Application March 6, 1940, Serial No. 322,539. In Germany July 27, 1939

5 Claims. (Cl. 260—461)

The present invention relates to a process of purifying phosphoric acid esters used for the dephenolization of waste aqueous liquors.

Phosphoric acid esters, as trialkyl- or triarylphosphates, for example tricresyl phosphate, are frequently employed for the extraction of phenols from waste aqueous liquors containing phenols. When so used they are contaminated by the absorption of non-volatile or difficultly volatile substances contained in the liquors in addition to phenols. When removing the phenols from the esters by distillation the impurities are retained in the esters, these becoming thereby considerably enriched within a relatively short time if the esters are repeatedly used for phenol extraction after distilling the phenols.

Esters containing from about 10 to 15 per cent of contaminations non-removable by distillation are hardly capable of absorbing phenols any longer and require thorough purification.

By conventional methods the contaminations were precipitated by treating the esters with concentrated sulphuric acid and then removed mechanically, for example by filtration. This method of working has the drawback that sulphonic acids are formed in considerable proportions which provoke a marked solubility of the esters in water with a consequent high loss of esters. Besides, the precipitation of asphaltic substances is incomplete in many instances, as shown by the dark coloration of the esters after their treatment with sulphuric acid. The filtration of the substances precipitated gives no satisfactory results also, because the filter residue retains substantial proportions of ester.

We have now found that the said drawbacks can be avoided by mixing the esters to be purified with finely ground inert substances and dissolving the esters out therefrom by means of a solvent which advantageously has no or but little dissolving power towards asphalts, preferably with aliphatic hydrocarbons, for example light naphtha, or liquefied hydrocarbon gases, for example propane or butane.

As inert substances may be used for example fine sand, ground bricks, glass powder or other pulverized ceramic materials. Ashes, too, will excellently serve the purpose, especially brown coal ashes, preferably when burned out to such an extent that carbon is practically no longer contained therein.

The use of such inert materials instead of materials having a large inner surface offers the advantage that the esters are less strongly retained by them and may thus be more readily dissolved out with a smaller amount of solvent.

The following example will further illustrate the nature of this invention but the invention is not restricted thereto.

*Example*

Tricresylphosphate used for the dephenolization of waste aqueous liquors from coal or oil hydrogenation plants and containing about 14 per cent of contaminations non-volatile with steam distillation, is mixed after removing the phenols, with four times its weight of a completely burned-out brown coal boiler ash.

The resulting mass is extracted at room temperature with a hydrocarbon mixture (boiling point range from 35 to 60° C.) which mainly consists of hydrocarbons of the paraffin series with from 5 to 9 carbon atoms. The tricresylphosphate which is practically completely recovered after evaporating the solvent is completely free of non-volatile contaminations.

What we claim is:

1. A process for purifying phosphoric acid esters used for the dephenolization of waste aqueous liquors and freed from phenols but containing asphaltic substances, which comprises mixing the esters with finely ground inert substances and dissolving the esters from the mixture by means of low boiling aliphatic hydrocarbons.

2. The process as defined in claim 1 wherein the inert finely ground substance is completely burned-out coal ashes.

3. The process as defined in claim 1 wherein the inert finely ground substance is completely burned-out brown coal ash.

4. The process as defined in claim 1 wherein the low boiling aliphatic hydrocarbon is a light naphtha boiling substantially between 35 and 60° C.

5. The process as defined in claim 1 wherein the low boiling aliphatic hydrocarbon is propane.

HERMANN BEEG.
KURT WEICHERT.